United States Patent [19]

Bishop et al.

[11] Patent Number: 4,809,238

[45] Date of Patent: Feb. 28, 1989

[54] METHOD FOR RESTORING THE BACKGROUND APPEARANCE OF TWO-DIMENSIONAL FILTERED SEISMIC DATA

[75] Inventors: Glen W. Bishop, La Porte; Scott C. Hornbostel, Houston, both of Tex.

[73] Assignee: Exxon Production Research Company, Houston, Tex.

[21] Appl. No.: 839,856

[22] Filed: Mar. 14, 1986

[51] Int. Cl.⁴ .............................................. G01V 1/00
[52] U.S. Cl. .......................................... 367/46; 367/45
[58] Field of Search ..................... 367/37, 38, 39, 40, 367/41, 43, 45, 46, 53, 62, 901; 364/421

[56] References Cited

U.S. PATENT DOCUMENTS

| | | | |
|---|---|---|---|
| 3,012,234 | 12/1961 | Burns | 367/38 X |
| 3,163,750 | 12/1964 | Lindsey et al. | 364/421 X |
| 3,275,980 | 9/1966 | Foster | 367/46 |
| 3,312,933 | 4/1967 | Lawrence et al. | 367/46 |
| 3,396,365 | 8/1968 | Kerns | 367/46 |
| 3,421,141 | 1/1969 | Meyerhoff | 367/45 X |
| 4,209,854 | 6/1980 | Ruehle | 367/43 |
| 4,210,968 | 7/1980 | Lindseth | 367/46 |
| 4,232,381 | 11/1980 | Rennick et al. | 367/901 |
| 4,243,935 | 1/1981 | McCool et al. | 367/45 X |
| 4,380,059 | 4/1983 | Ruehle | 367/24 X |
| 4,397,006 | 8/1983 | Galbraith, Jr. | 367/40 |

OTHER PUBLICATIONS

B. Widrow, et al., "Adaptive Noise Cancelling: Principles and Applications," IEEE Proc., vol. 63, No. 12, pp. 1692-1716 (1975).

Primary Examiner—Brian S. Steinberger
Attorney, Agent, or Firm—Alfred A. Equitz; Keith A. Bell

[57] ABSTRACT

A method for restoring to filtered seismic data at least some of the ramdom background noise associated with the data in its form prior to filtering. The method includes the steps of filtering seismic data in a two-dimensional filter; generating a noise signal representing the random background noise associated with the data; filtering the noise signal in an inverse filter corresponding to the two-dimensional filter; and adding the inverse-filtered first signal to the filtered seismic data. In one embodiment, the noise signal is generated by filtering a copy of the data in a least-mean-squares adaptive filter to remove substantially all coherent energy therefrom. In another embodiment, the noise signal is an independently generated white noise signal having beginning and end times matching those of the seismic data. This white noise signal is the bandpass filtered to cause its frequency content to match that of the seismic data. Examples of two-dimensional filters that may be employed include a dip filter, an effective filter associated with migration, or a filter used in running mix operations. Data processed in accordance with the invention have a completely filtered coherent portion and a restored background noise portion, so that the processed data, when displayed, exhibit greater reflector continuity, more accurate amplitude relationships, and better cosmetic acceptability.

17 Claims, 2 Drawing Sheets

METHOD FOR RESTORING THE BACKGROUND APPEARANCE OF TWO-DIMENSIONAL FILTERED SEISMIC DATA

FIELD OF THE INVENTION

The invention relates in general to seismic data processing techniques in which seismic data is filtered in a two-dimensional filter. More specifically, the invention is a method for restoring to two-dimensional filtered seismic data the random background noise associated with the data prior to filtering, by generating a noise signal representing the random background noise portion of the unfiltered data, filtering the data in a two-dimension filter, inverse-filtering the noise signal, and combining the inverse-filtered noise signal with the filtered data.

BACKGROUND OF THE INVENTION

There are a number of common procedures that invoice the two-dimensional filtering of seismic sections (of "field records"). A few examples of these procedures are migration, running mixes, and dip filtering. A drawback of these procedures is that they often give a mixed or otherwise degraded appearance to the output. This is largely due to the effect of the filtering on the random background noise of the unfiltered seismic data.

For example, typical random background noise associated with a seismic record has energy that covers a wide range of dip angles. This combination of dips gives the background a salt-and-pepper appearance. In the case where a dip filter is applied, energy at certain dip angles is removed. This causes the remaining noise, when displayed, to exhibit segments of coherent energy at the remaining angles. The effect of this filtering on the random noise is quite evident. Because certain (usually high-angle) noise components are missing, a display of a dip filtered seismic record reveals segments of coherent noise energy at dips within the passband of the dip filter. These segments of coherent noise can interfere with signal detection on dip-filtered seismic data, thus hampering interpretation and reducing the ability to define structural detail. They also can give dip-filtered sections a mixed or wormy appearance, which may lead to the false conclusion that the signal has been greatly mixed when, in fact, the problem is related to distortion in the background noise field.

There are a number of conventional techniques that attempt to correct some of the background-noise effects of dip filtering or other filtering processes. One subgroup of these techniques will be referred to herein as "incomplete filtering procedures." An example of an incomplete filtering procedure is the addition of some of the original unfiltered section on top of the filtered section. This reduces some of the background mixed appearance at the expense of incomplete filtering of the undesired coherent noise. An alternate way to produce the same result in the context of dip-filtering, is to design the dip filter so that the dip-reject area never drops below some low threshold.

Another incomplete filtering technique is the use of a running trace mix as a dip filter. In typical implementations, the number of traces and their weights are selected to put a null in wave number space (k-space) which preferentially reduces the coherent noise. The disadvantage of this kind of dip filter is that components of coherent and random noise can pass through the filter. Thus, although this technique produces a less mixed appearance, the coherent noise is not completely filtered.

A second subgroup of known background restoration procedures can be employed for the special dip-filtering case in which the coherent noise occupies only a narrow range of dips. If a sharp dip filter that removes only the offending dip is designed for this case, most random noise energy at higher and lower dips can pass through, thus preserving the background noise appearance. However, such procedure is not generally applicable to data associated with noise outside this special category.

In addition to incomplete filtering and narrow-band dip-filtering approaches, there are other known background restoration procedures. One such procedure is the addition of computer-generated white noise to the filtered seismic data. This can sometimes help reduce extreme filtering problems, but has the disadvantage that too much noise is needed to overcome the filtering problems. Another procedure used with migrated sections is the preservation of the high-angle (over 45°) components that are usually thrown away prior to migration. The preservation of the high-angle noise can help reduce some of the mixed appearance typical in migration. However, a drawback of the procedure is that the high-angle components will be migrated, even though they do not represent real data.

It has not been known until the present invention how to restore the appearance of the random background noise portion of a set of completely filtered seismic data while also completely filtering the coherent energy portion (including coherent noise and coherent signal components) of the data. Two-dimensional filtered seismic data processed in accordance with the inventive method has better cosmetic acceptability, greater reflector continuity and more accurate amplitude relationships than two-dimensional filtered data not so processed.

SUMMARY OF THE INVENTION

The present invention is a method for restoring to filtered seismic data the random background noise associated with the data prior to filtering. The inventive method includes the steps of generating a noise signal representing the random background noise portion of the unfiltered data; filtering the data in a two-dimensional filter; inverse-filtering the noise signal; and combining the inverse-filtered noise signal with the filtered data.

A first embodiment of the invention includes the step of producing a noise signal based on the original unfiltered seismic data section. This is done by applying a least-mean-square (LMS) adaptive algorithm that removes substantially all coherent energy from a copy of the original seismic data. The resulting random noise signal is then inverse-filtered in order to keep the energy that the two-dimensional filtering process normally removes from the original section's background noise. The prepared, inverse-filtered noise is then added to the filtered data so that the random background noise portion of the data appears as if it had been substantially unaffected by the filtering.

A second embodiment of the invention includes the step of independently generating a white noise signal that matches the frequencies and amplitudes of the original data's background noise. This white noise signal is then inverse-filtered and combined with the two-dimensional filtered seismic data.

The improvements resulting from the two embodiments of the invention are similar, although the LMS procedure will usually be preferable since the noise comes from the original set of seismic data itself. The improvements resulting from performance of the inventive method include greater reflector continuity, more accurate amplitude relationships between reflectors, and better cosmetic acceptability.

DETAILED DESCRIPTION OF THE PREFERRED EMBODIMENT

Figure 1:
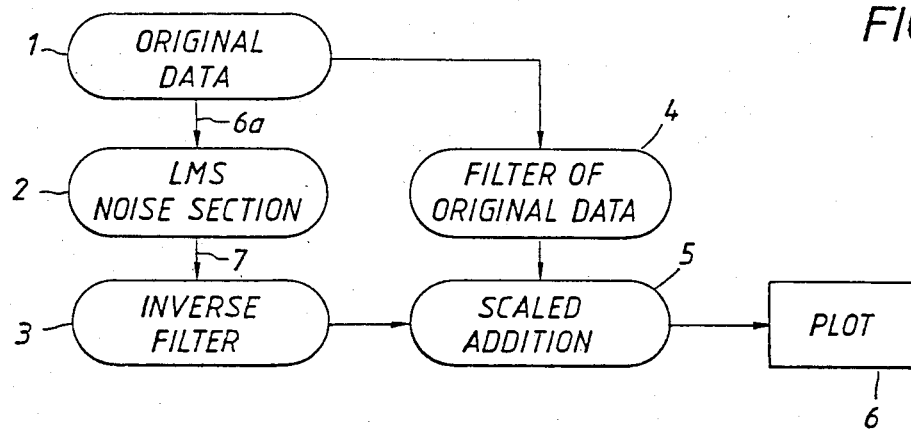
FIG. 1 is a flowchart diagram showing the steps of a first embodiment of the inventive method.

The invention is a method for processing seismic data. Seismic data is commonly generated by transmitting seismic signals through the earth so that the signals are reflected by subterranean interfaces, and then detecting and recording the reflected signals. The time lapse between the transmission and detection of such a seismic signal give the two way travel time of the seismic signal through the earth. Typically, many subterranean interface are present in the earth, and a transmitted signal is reflected by a number of such interfaces to produce a number of reflected signals. The reflected signals associated with a source point and a detection point may be recorded as a seismic data trace.

The traces associated with various pairs of source and detection points (usually lying in the same vertical plane) are typically displayed side-by-side as "seismic records" or may be combined to represent a cross section of the vertical plane as a "seismic section".

Various seismic data processing procedures require two-dimensional filtering of a set of seismic data. Examples of such procedures include migration, running trace mixes, and dip filtering. The term "two-dimensional filtering" is used throughout the specification, including the claims, to denote any operation performed on a set of seismic data where the data are capable of being displayed as a two-dimensional seismic section before and after the operation is performed.

A preferred embodiment of the invention will be described with reference to FIG. 1. Seismic data 1 is processed by two-dimensional filter 4. Filter 4 will be denoted as W. A copy 6a of seismic data 1 is also processed in element 2 to remove all coherent signal and coherent noise (all "coherent energy"), thus generating noise signal 7 representing the random background noise of original seismic data 1. The preferred embodiment of element 2 will be described in greater detail below with reference to FIG. 2. Signal 7 is then processed in inverse filter 3. Inverse filter 3 is the inverse filter associated with filter 4, and will be denoted herein as Wi. In an embodiment in which filter 4 is a dip filter, filter 4 will be denoted as W(d) and filter 3 will be denoted as Wi(d), where d is a parameter representing angle of dip. Inverse filter Wi should be designed so that application of filter W to a first copy of seismic data 1, application of inverse filter Wi to a second copy of seismic data 1, and addition of the filtered first copy to the inverse-filtered second copy results in data substantially identical to original seismic data 1.

The filtered data produced at the output of filter 4 is added to the inverse-filtered signal produced at the output of filter 3 in scaled addition element 5. The output of element 5 may then be displayed in any conventional form, such as by plotting in a conventional plotting unit such as unit 6. The signals produced at the output of filters 3 and 4 should not be subjected to automatic gain control (AGC) until after they have been added together, since their relative amplitudes must be preserved. It is desirable to multiply the signal output from filter 3 by some overall scale factor before adding it to the signal produced at the output of filter 4. Adequate appearance of the processed signal produced at the output of element 5 can usually be obtained where the amplitude of the inverse-filtered signal emerging from filter 3 is multiplied by an overall scale factor in the range from 50% to 75%.

It will be recognized by those of ordinary skill in the art to which the invention pertains that the most practical seismic data filtering techniques usually involve digitizing the seismic data, and then processing the digitized data in digital filters implemented in software in a suitable computer. The method of the invention may be implemented by processing digitized seismic data using a conventional digital version of filter 4, a conventional digital version of addition unit 5 (including software for performing the above-described scale factor multiplication), and a digital version of inverse filter 3. Given a particular filter 4, an appropriate inverse filter may be designed and translated into a series of computer instructions in a manner that will be apparent to those ordinarily skilled in the art of seismic data processing computer programming. In the FIG. 1 embodiment, inverse filter 3 is preferably simply $Wi = 1 - W$, where 1 represents the unity filter. A suitable display of the processed digitized data may be produced by conventional display means.

Alternatively, the inventive method may be performed on analog seismic data using a conventional analog version of filter 4, a conventional analog version of addition unit 5 (including circuitry for performing any desired scale factor multiplication), and an analog version of filter 3. It will be apparent to those of ordinary skill in the art of analog seismic data processing how to design a suitable analog inverse filter 3 given a particular filter 4.

Figure 2:
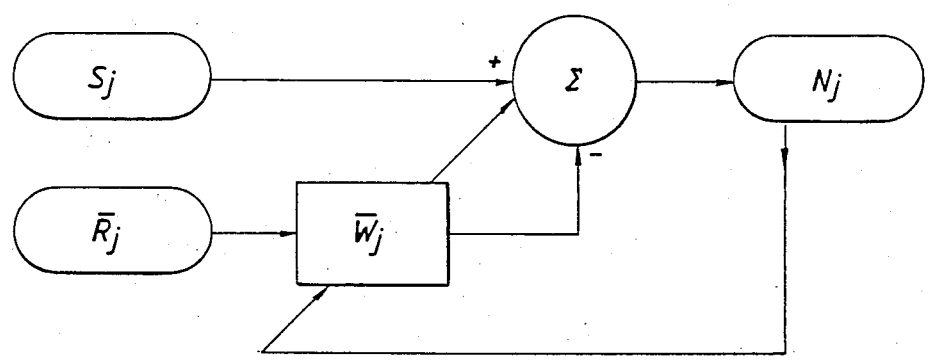
FIG. 2 is a flowchart diagram showing the steps of the least-mean-square adaptive method for generating a noise signal representing the random background noise associated with a set of seismic data.

Signal 7 of the FIG. 1 embodiment is preferably generated from copy 6a of data 1 using the least-mean squares (LMS) adaptive filter diagrammed in FIG. 2. The LMS adaptive algorithm involves automatic adjustment of filter coefficients in a way that minimizes some mean-squared error. The LMS algorithm has been used as an adaptive algorithm in such applications as beam steering and adaptive noise cancellation, to cancel correlated noise or to extract an unknown signal from noise. See, for example, B. Widrow, et al., "Adaptive Noise Cancelling: Principles and Applications," IEEE Proc., Vol. 63, No. 12, pp 1692–1716 (1975). In the inventive method, the LMS algorithm is used for a very different purpose of canceling all trace-to-trace coherent signal and coherent noise from each trace of a seismic record. The seismic record, after filtering in the inventive LMS adaptive filter, becomes a noise signal representing only the random background noise associated with each trace in the original record.

In FIG. 2, $S_j$ is a particular trace to be processed, $\overline{R}_j$ is data from several adjacent traces within some time window, $\overline{W}_j$ is the set of adaptive filter coefficients which match the time and trace window used, and $N_j$ is the output sample which is an estimate of the random part of $S_j$.

At the end of each of a number of iterations, the algorithm outputs a noise sample $N_j$ and then adjusts the filter coefficients $\overline{W}_j$ by some small amount controlled by the adaptation constant $\mu$:

$$N_j = S_j - \overline{R}_j^T \overline{W}_j \qquad (C.1)$$

$$\overline{W}_{j+1} = \overline{W}_j + 2\mu N_j \overline{R}_j \qquad (C.2)$$

Equation (C.1) represents the application of the current filter, whereas equation (C.2) represents a slight adjustment in the filter to be applied in the next iteration.

When the statistics are constant and $\mu$ approaches zero, the filter will converge on the Wiener solution. The Weiner solution is one that removes the part of the sample $S_j$ that is correlated with the adjacent traces. Under these conditions, the method would remove all trace-to-trace coherence. In typical seismic data, however, the statistics of signal and noise are constantly changing. Therefore, it is necessary to choose some finite adaptation constant that allows sufficiently rapid adaptation to track these changes, but one that is still small enough to allow convergence. In practice, some choice of a suitable adaptation constant is usually possible.

The embodiment described above with reference to FIGS. 1 and 2 is the preferred embodiment of the invention for most applications, since the noise signal to be combined with the filtered seismic data comes from the original seismic data itself. However, there are applications in which it would be preferable to employ a second embodiment of the invention to be described below with reference to FIGS. 3 and 4. This second embodiment includes the steps of independently generating white noise; processing the white noise; and then combining the processed white noise with filtered seismic data. The second embodiment is preferable, for example, when the LMS adaptive technique is unable to adapt sufficiently rapidly to remove substantially all coherence from an original set of seismic data, or when greater flexibility in controlling the characteristics of the noise to be combined with the seismic data is desired.

Figure 3:
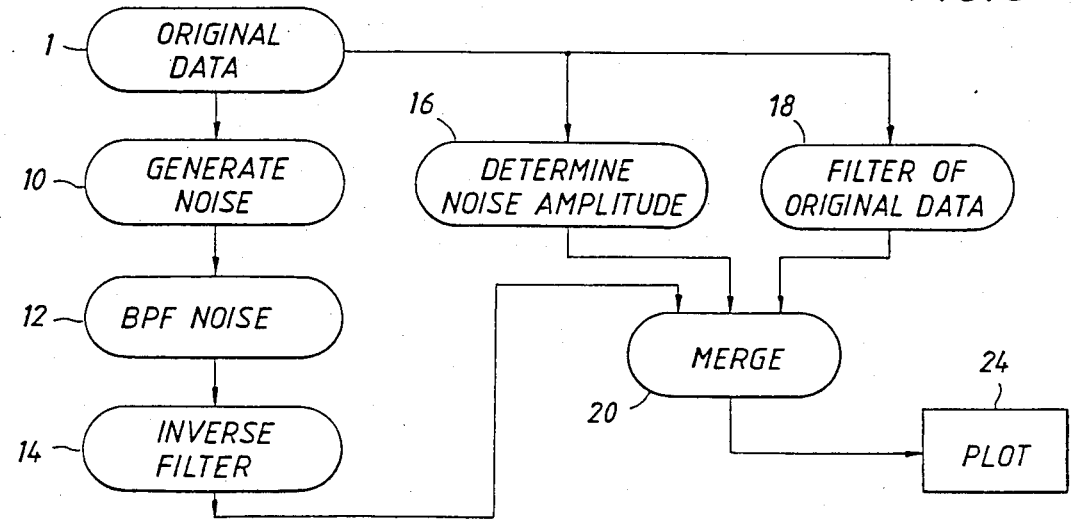
FIG. 3 is a flowchart diagram showing the steps of a second embodiment of the inventive method.

In the embodiment of the invention shown in FIG. 3, seismic data 1 is processed in two-dimensional filter 18. Filter 18 will be denoted as W (or as W(d), where d is a parameter representing angle of dip, in the case that filter 18 is a dip filter). Independently, white noise signal 10 is generated. White noise signal 10 should have beginning and end times that match those of seismic data 1. Typically, data 1 will be a seismic record, and white-noise signal 10 will include one portion (of "noise trace") corresponding to each trace of the seismic record such that each noise trace has beginning and ending times matching those of the corresponding records trace. Signal 10 is then band-pass filtered to produce filtered white noise signal 12 having frequency content approximately matching that of the background noise of seismic data 1. Signal 12 is then processed in inverse filter 14. Inverse filter 14 will be denoted herein as Wi (or Wi(d), where d is a parameter representing angle of dip, in the case that inverse filter 14 is an inverse dip filter).

In either the FIG. 1 or FIG. 3 embodiment, where the two-dimensional filter to be employed is a dip filter, the inverse dip filter Wi(d) is preferably designed to satisfy the following relation:

$Wi(d) = (1 + (C^2 - 1)W^2(d))^{\frac{1}{2}} - CW(d)$, where C is defined by the relation $V_n = CU_n + (1 - C^2)^{\frac{1}{2}} \overline{U}_n$, where $V_n$ is the noise signal to be filtered in inverse filter Wi(d) and then combined with dip filtered seismic data 1, $U_n$ is the random background noise associated with original seismic data 1 (i.e. the portion of seismic data 1 remaining after all coherent energy has been eliminated therefrom), and $\overline{U}_n$ is a noise signal that is completely uncorrelated with signal $U_n$.

Thus, in the FIG. 3 embodiment, signal $V_n$ (a band-pass filtered white noise signal) is completely uncorrelated with original seismic data 1, so that C=0, and $Wi(d) = (1 - W^2(d))^{\frac{1}{2}}$.

In the FIG. 1 embodiment, the signal $V_n$ is correlated to some degree with the background noise of the original seismic data. As a result, the ideal inverse dip filter will be determined by the formula $Wi(d) = (1 + (C^2 - 1)W^2(d))^{\frac{1}{2}} - CW(d)$, where $0 < C \leq 1$. However, for ease of implementation, the inverse filter determined by the formula with C=1, will be preferred in most common applications of this embodiment, since the inventive method is not generally sensitive to the precise inverse filter design employed.

Continuing the description of the FIG. 3 embodiment, the output of inverse filter 14 is supplied to merging unit 20. A second signal, representing the approximate random noise level of original seismic data 1 is generated in noise amplitude unit 16, and is supplied as the second input to merging unit 20. Also, the filtered data emerging from two-dimensional filter 18 is supplied as the third input to merging unit 20.

The second signal, representing approximate average absolute amplitude of random background noise associated with seismic data 1, is important in proper implementation of the invention since the amount of random noise removed during a filtering operation is dependent on how much noise was there to begin with. A suitable method for producing the second signal is described below. This method is based on the assumption that the random noise is uncorrelated from trace to trace, whereas the coherent noise and coherent signal are highly correlated between traces.

For simplicity, this method will be described in an embodiment of the invention in which two-dimensional filter 18 is a dip filter. In this example, a few adjacent traces from the original seismic data in some time window are first stacked along a dip of maximum coherence. The resulting average absolute value (AABV) of this summation will be a function of the original signal and noise levels. For the case of seismic data consisting of pure coherent energy, the AABV's will add up simply as the number of traces. For the case of seismic data consisting of pure random noise, the AABV's will add up as the square root of the number of traces. For the general case where the AABV of this summation falls between these two limits, the initial noise level can be inferred from the AABV of the sum.

To derive the general relationship between noise level and AABV, we start by defining a seismic trace, $t_i(k)$, as a sum of signal and noise $$t_i(k) = As(k) + Bn_i(k)$$

where $s(k)$ and $n_i(k)$ are the uncorrelated signal and noise defines to have AABV's equal to one, A and B are scale factors, and k represents discrete time samples. Other nearby traces, $t_i(k)$, over the same time window, are assumed to have the same relative signal and noise levels, A and B, and to have identical signal, $s(k)$, but uncorrelated noise $n_i(k)$. The expected average absoulte value of $t_i(k)$ over this time window is defined as $C_i$ and is a function of A and B when $s(k)$ and $n_i(k)$ are zero mean and Gaussian:

$$C_i = (A^2 + B^2)^{\frac{1}{2}} \tag{D.1}$$

which is also equal to the expected AABV of any of the adjacent traces $t_i(k)$.

When N adjacent traces ($t_i(k)$, i=1 to N) are summed along a dip of maximum coherence, the summed trace T(k) is obtained with the expected average value of $C_{sum}$. For this summation, the coherent signal or coherent nosie is assumed to be present at a single dip within the specified time and trace window. The errors incurred by multiple coherent dips or by no coherent dips are generally not too significant.

The summed trace T(k) can be evaluated as follows:

$$\begin{aligned} T(k) &= \sum_N t_i(k) \\ &= A \sum_N s(k) + B \sum_N n_i(k) \\ &= A N s(k) + B \sum_N n_i(k) \end{aligned}$$

The expected average absolute value of T(k) is thus:

$$\begin{aligned} C_{sum} &= ((AN)^2 + (B\sqrt{N})^2)^{\frac{1}{2}} \tag{D.2} \\ &= (A^2 N^2 + B^2 N)^{\frac{1}{2}} \end{aligned}$$

This is because $s(k)$ and $n_i(k)$ have AABV's of unity and because the noise AABV's add up as the square root of N. Combining (D.1) and (D.2) and solving for B in terms of $C_i$ and $C_{sum}$ gives:

$$B = [(C_i^2 N^2 - C_{sum}^2)/(N^2 - N)]^{\frac{1}{2}} \tag{D.3}$$

which defines the expected noise level in terms of the AABV of the separate traces, the AABV of the summed trace, and the number of traces summed. The portion (scale factor) of the "second signal" representing this noise level for trace "$t_i$" and a particular time window (i.e. the scale factor representing the noise level of the portion of trace $t_i$ within the particular time window) is used to scale the corresponding portion of the inverse-filtered noise signal emerging from inverse filter 14 (by multiplication of the second signal with the inverse-filtered noise signal) so that the scaled amplitudes will approximate the random background noise levels of original seismic data 1.

The merging operation performed in merging unit 20 includes the step of multiplying each portion of the inverse-filtered noise signal (produced in inverse filter 14) corresponding to a trace of original data 1 by the portion of the second signal (produced in unit 16) corresponding to such trace. The multiplied signal portions are then multiplied by an overall scale factor. Thus, the net effect of the described multiplication steps is to multiply the inverse-filtered noise signal by time-varying scale factors, so that each portion of the inverse-filtered noise signal (corresponding to a definite time period) may be multiplied by a different scale factor. The overall scale factor will preferably be the smallest factor that gives rise to adequate appearance of the completely processed data emerging from merging unit 20. Typically, as in the FIG. 1 embodiment, this overall scale factor will be in the range from 50% to 75%.

The product of the scale factor with the multiplied signal is then added, in merging unit 20, to the filtered seismic data produced at the output of filter 18. The summed signal produced in unit 20 may be displayed in any conventional format, such as by plotting the data in a conventional plotting unit such as unit 24.

Figure 4:
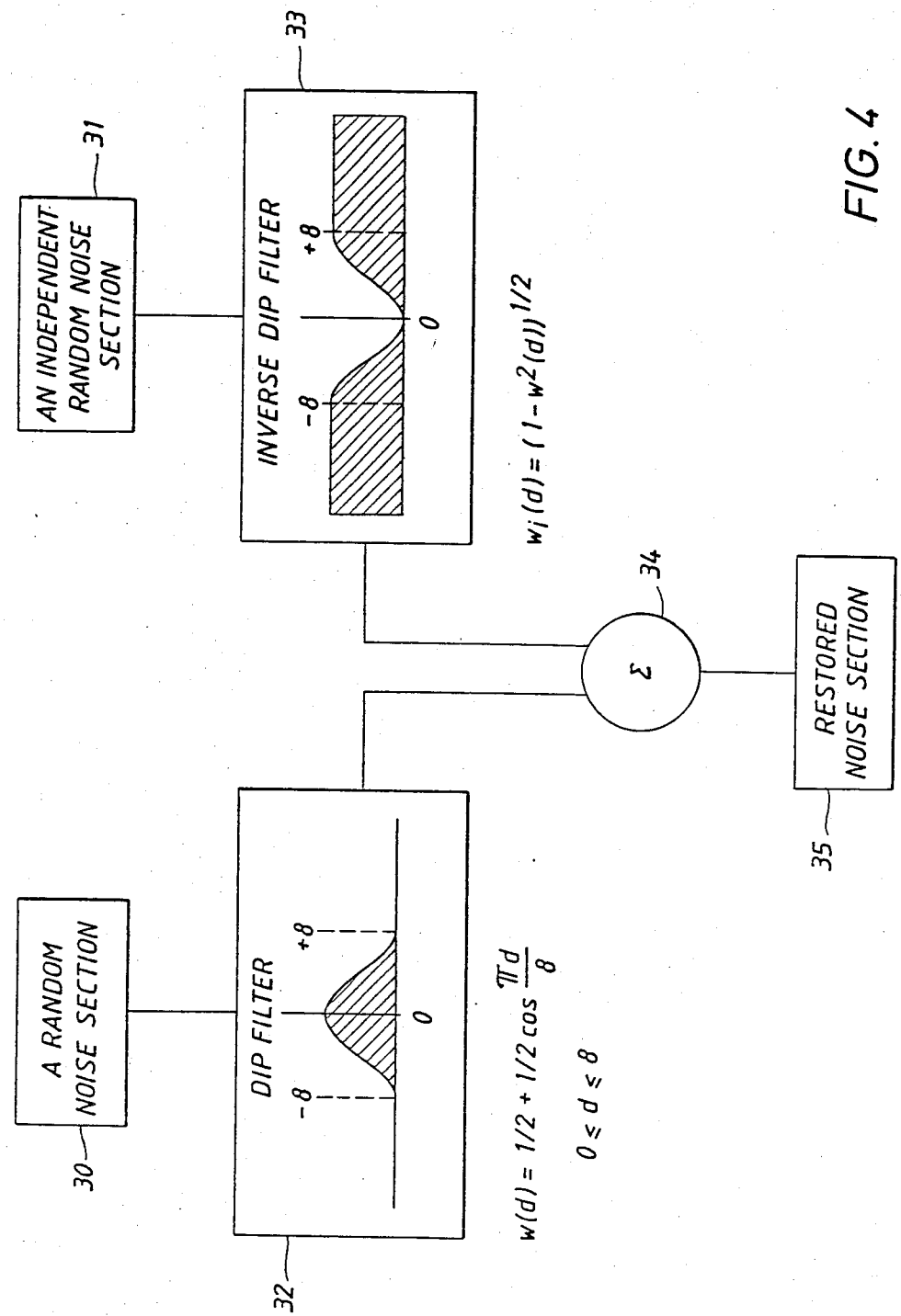
FIG. 4 is a diagram schematically showing application of the FIG. 3 embodiment to a random noise section.

An example of application of the FIG. 3 embodiment of the invention to random noise section 30 is schematically shown in FIG. 4. Section 30 is a set of random noise including no coherent signal or coherent noise. Section 30 may be thought of as representing the random noise portion of a typical seismic section. Dip filter 32 in the FIG. 4 example is equal to $W(d) = \frac{1}{2} + \frac{1}{2} \cos(\pi d/8)$, where $0 \leq d \leq 8$, and inverse dip filter 33 is equal to $Wi(d) = (1 - W^2(d))^{\frac{1}{2}}$.

Random noise section 31 is independently generated and processed so that its beginning and end times, frequency content, and amplitudes match that of section 30. Dip filter 32 is applied to section 30. Inverse filter 33 is applied to section 31 to approximate the high dips (having large values of d) removed from section 30 during dip filtering.

Next, dip filtered section 30 is summed point-by-point with inverse-filtered section 31 in summation unit 34, resulting in dip-restored section 35. When displayed, section 35 will have appearance substantially identical to that of section 30, since its dip energy spectrum is substantially identical to that of section 30.

Some of the improvements resulting from performing the invention on a set of seismic data include greater reflector continuity, more accurate amplitude relationships, and better cosmetic acceptability.

The second of these advantages may be understood as follows. The relative amplitudes between different horizons and changes in amplitude of a seismic signal along a specific horizon are often quite important for seismic interpretation. When seismic data are dip-filtered and subjected to automatic gain control ("AGC"), these amplitude differences can be lost. The AGC operation after dip-filtering frequently boosts the low-level noise and low-level signal to the point that they look like the stronger signal energy. Performing the invention on the data controls this problem by adding in (before AGC) the random noise that was removed by dip-filtering. This limits the gain applied by AGC to the weaker parts of the section, thus helping to maintain the original amplitude relationships.

We have found that interpreters generally prefer the appearance of sections processed in accordance with the invention (in cases where the two-dimensional filter is a dip filter) because it is easier to detect reflections through an incoherent random background than through a background with the same dips as the signal. Processing in accordance with the invention helps maintain the proper background appearance by returning the background noise to its more acceptable salt-and-pepper characteristic. This reduces worminess and the confusion of flat coherent noise with signal. A section processed in accordance with the invention does not exhibit the negative effects of dip-filtering, thus adding confidence to the interpretation.

Another advantage of the invention is that it provides greater flexibility in selecting suitable two-dimensional filters for processing seismic data, in the following respect. For specificity, the following discussion will refer to the process of selecting a dip filter, though it may be generalized in an apparent manner to refer to any particular type of two-dimensional filter.

The proper choice of a dip filter for seismic data requires consideration of three basic effects: the dip range of the signal compared to the dip range of the noise to be removed; artifacts of the chosen filter; and background noise effects such as mixed, wormy appearance in the filtered section.

The initial consideration in designing the dip filter is to choose the dip passband and reject band that remove a maximum amount of noise and have a minimum effect on the desired signal. This is not always easy when signal and noise dip ranges overlap, but some tradeoff is usually acceptable.

The second and third basic effects normally require some tradeoff as well. On the one hand, filter artifacts are frequently encountered when a sharp cutoff between passband and reject band is employed; on the other hand, a smoother cutoff may lead to inadequate signal and noise separation and a more degraded background noise appearance.

When the inventive method is to be performed on the data, the nature of the tradeoff is somewhat different. For example, a smoother cutoff may be employed to reduce filter artifacts at the expense of a more degraded background effect (since more random energy is removed). When the data is processed in accordance with the invention, the degraded appearance is largely corrected. In general, selection of dip filters for use with data to be processewd in accordance with the invention should emphasize reducing filter artifacts and not be as concerned with background worminess since this latter effect can be largely corrected by the inventive method.

It is within the scope of the invention to perform the necessary processing steps on seismic data by processing the data in a suitable computer. To accomplish this, the above-described procedures (and the desired two-dimensional filters and their inverse filters) are translated into series of computer instructions in a manner that will be apparent to those ordinarily skilled in the art of computer programming for seismic data processing. In one variation on this class of embodiments, the seismic data are digitized and the digitized signals are processed in a computer. It is also within the scope of the invention to perform the necessary processing steps by processing the data (whether in the form of an analog or digital signal) using hardwired (analog or digital) electronic circuits. To accomplish this, the described procedures (and the desired two-dimensional filters and their inverse filters) are embodied in circuitry whose detailed design will be apparent to those ordinarily skilled in the art of hardwired circuit design for seismic data processing.

The above description is merely illustrative of the invention. Various changes in the detail of the methods described may be within the scope of the appended claims without departing from the spirit of the invention.

We claim:

1. A method for filtering two-dimensional seismic data having a coherent energy portion and a random background noise portion, said method comprising the steps of:
generating a noise signal representing said random background noise portion of said seismic data;
filtering said seismic data in a first two-dimensional filter to produce filtered seismic data;
filtering said noise signal in a second two-dimensional filter, said second filter being an inverse filter to said first filter, to produce an inverse-filtered noise signal;
adding said inverse-filtered noise signal to said filtered seismic data to produce background restored, filtered seismic data; and
displaying said background restored, filtered seismic data.

2. The method of claim 1, wherein said noise signal is generated by filtering a copy of said seismic data in a third two-dimensional filter adapted to remove substantially all of said coherent energy portion from said seismic data.

3. The method of claim 2, wherein said third two-dimensional filter is a least-mean-squares adaptive filter.

4. The method of claim 1, wherein said first two-dimensional filter is a dip filter, W(d), where d represents angle of dip, and said second two-dimensional filter is an inverse filter, Wi(d), to said dip filter, and Wi(d)=1−W(d).

5. The method of claim 1, wherein said seismic data comprises a plurality of seismic data traces having beginning and end times, and wherein said noise signal is generated by performing the following steps:
generating a white noise signal having beginning and end times which substantially match said beginning and end times of said seismic data traces;
bandpass-filtering said white noise signal to produce a filtered white noise signal having a frequency content substantially similar to that of said random background noise portion of said seismic data; and
applying time-varying scale factors to said filtered white noise signal to produce a scaled, filtered white noise signal having an average absolute amplitude substantially similar to that of said random background noise portion of said seismic data, where said scaled, filtered white noise signal is said noise signal.

6. The method of claim 5, wherein said first two-dimensional filter is a dip filter, W(d), where d represents angle of dip, and said second two-dimensional filter is an inverse filter, Wi(d), to said dip filter, and $Wi(d)=(1-W^2(d))^{\frac{1}{2}}$.

7. The method of claim 1, wherein said method further comprises multiplying said inverse-filtered noise signal by an overall scale constant prior to adding said inverse-filtered noise signal to said filtered seismic data, said overall scale constant being less than 100%.

8. The method of claim 7, wherein said overall scale content is in the range from about 50% to about 75%.

9. A method for filtering two-dimensional seismic data having a coherent energy portion and a random background noise portion, said method comprising the steps of:
filtering a first copy of said seismic data in a first two-dimensional filter to produce filtered seismic data;
filtering a second copy of said seismic data in a second two-dimensional filter, said second filter being a least-mean-squares adaptive filter, to remove sustantially all of said coherent energy portion from said seismic data, thereby generating a noise signal representing said random background noise portion of said seismic data;

filtering said noise signal in a third two-dimensional filter, said third filter being an inverse filter to said first filter, to produce an inverse-filter noise signal;

multiplying said inverse-filtered noise signal by an overall scale constant less than 100% to generate a scaled, inverse-filtered noise signal;

adding said scaled, inverse-filtered noise signal to said filtered seismic data to produce background-restored, filtered seismic data; and displaying said background-restored, filtered seismic data.

10. The method of claim 9, wherein said first two-dimensional filter is a dip filter.

11. A method for filtering two-dimensional seismic data having a coherent energy portion and a random background noise portion, said seismic data being composed of a plurality of seismic data traces, said method comprising the steps of:

filtering said seismic data in a first two-dimensional filter to produce filtered seismic data;

generating a white noise signal having beginning and end times substantially matching those of said seismic data traces;

bandpass-filtering said white noise signal in a second two-dimensional filter to produce a filtered white noise signal having a frequency content substantially similar to that of said random background noise portion of said seismic data;

filtering said filtered white noise signal in a third two-dimensional filter, said third filter being an inverse filter to said first filter, to produce an inverse-filtered white noise signal;

generating a second signal representing the approximate average absolute amplitude of said random background noise portion;

multiplying said inverse-filtered white noise signal by said second signal to generate a background noise signal having an average absolute amplitude substantially similar to that of said random background noise portion of said seismic data;

adding said background noise signal to said filtered seismic data to produce background-restored, filtered seismic data; and displaying said background-restored, filtered seismic data.

12. The method of claim 11, wherein said first two-dimensional filter is a dip filter.

13. The method of claim 11, further comprising the step of multiplying said background noise signal by an overall scale constant in the range from about 50% to about 75% prior to adding said background noise signal to said filtered seismic data.

14. A method for restoring the background appearance of a two-dimensional seismic section following filtering of the seismic data for said seismic section in a first two-dimensional filter, said seismic data containing both coherent energy and random background noise prior to said filtering, said filtering having removed part of said random background noise from the filtered seismic data thereby degrading the background appearance of said seismic section, said method comprising the steps of:

generating a noise signal representing said random background noise prior to said filtering of said seismic data;

filtering said noise signal in a second two-dimensional filter, said second filter being an inverse filter to said first filter, to produce an inverse-filtered noise signal representing said part of said random background noise which was removed from said seismic data during filtering of said seismic data;

adding said inverse-filtered noise signal to said filtered seismic data to produce background-restored seismic data; and generating a seismic section from said background-restored seismic data.

15. The method of claim 14, wherein said noise signal is generated by filtering a copy of said seismic data in a third two-dimensional filter adapted to remove substantially all of said coherent energy from said seismic data.

16. The method of claim 15, wherein said third two-dimensional filter is a least-mean-squares adaptive filter.

17. The method of claim 14, wherein said first two-dimensional filter is a dip filter.

* * * * *